March 7, 1950   M. J. SCHLITTERS   2,499,529
CUTOFF AND FORM TOOLHOLDER
Filed Feb. 13, 1946   2 Sheets-Sheet 2

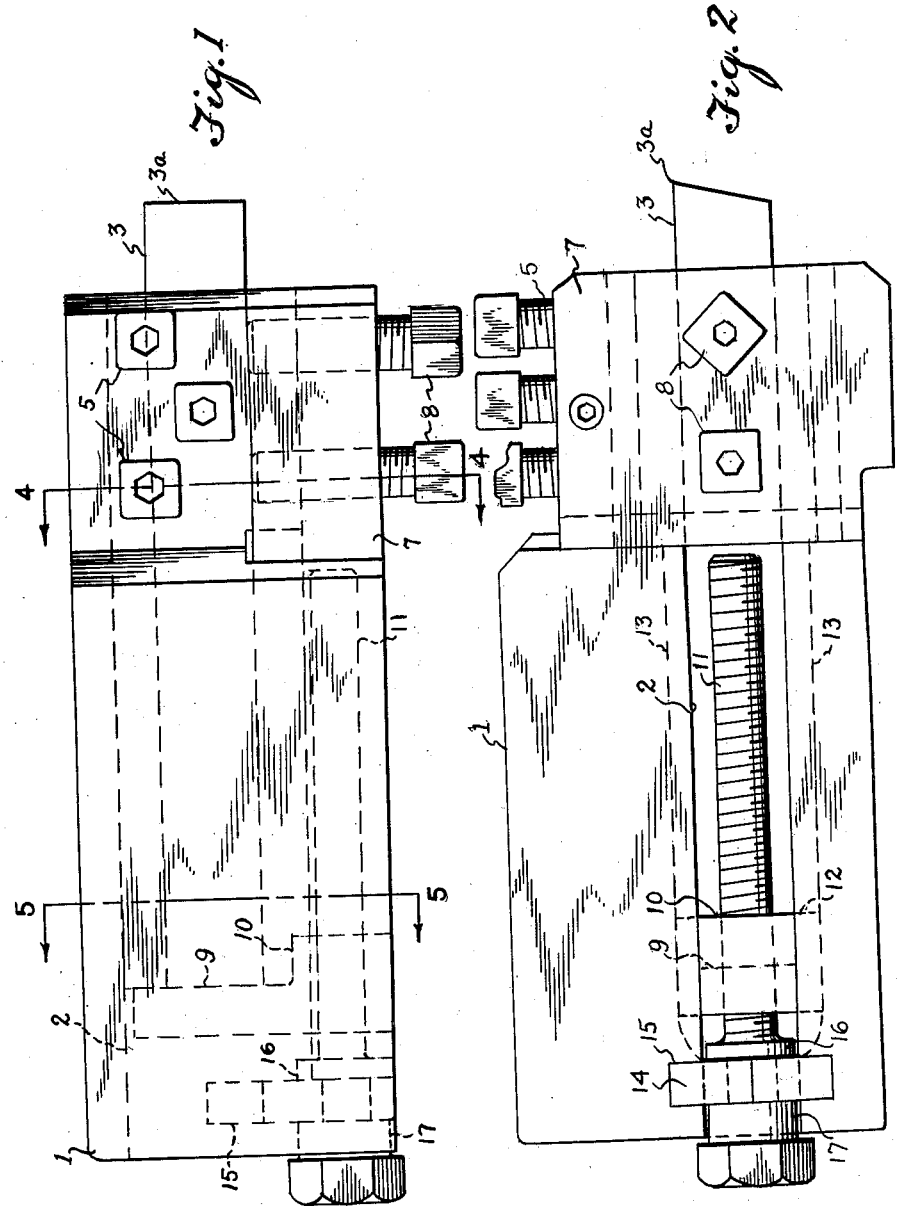

INVENTOR.
Michael J. Schlitters
BY
J S Murray
ATTORNEY

Patented Mar. 7, 1950

2,499,529

UNITED STATES PATENT OFFICE 2,499,529

CUTOFF AND FORM TOOL HOLDER

Michael J. Schlitters, Grosse Pointe Park, Mich.

Application February 13, 1946, Serial No. 647,319

5 Claims. (Cl. 29—96)

This invention relates to tool holders for screw machine use and particularly holders for cutoff and form tools.

As heretofore constructed, holders for cutoff and form tools have been suited to only one size of tool or else to a few slightly differing sizes. Also provisions heretofore made for resisting back thrust of such tools have lacked any convenient forward and back adjustment. Prior tool holders, moreover, have not been designed to afford removal of the tool, when necessary, without first removing the holder from its supporting slide.

An object of the present invention is to provide a tool holder suited to operatively receive a considerable range of differently sized tools.

Another object is to equip a tool holder with an abutment receiving the back thrust or cutting reaction of the tool, and designed to function for any location of the tool in the holder and for any size tool insertible in the holder, and adjustable forwardly and back to afford compensation for tool wear and to regulate the extent of exposed length of the tool.

Another object is to adopt a cutting tool to be clamped in a novel and very secure manner in its holder, facilitating a lateral removal of the tool from the holder.

These and various other objects are attained by the construction hereinafter described and illustrated in the accompanying drawings, wherein:

Fig. 1 is a top plan view of the improved holder with a tool therein.

Fig. 2 is a side elevational view of the same.

Figure 3:
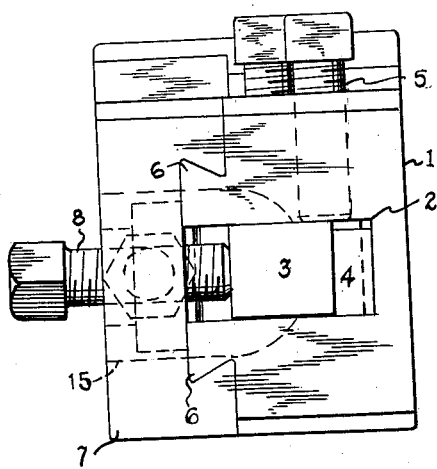
Fig. 3 is a front end view of the holder and tool.
Figure 4:
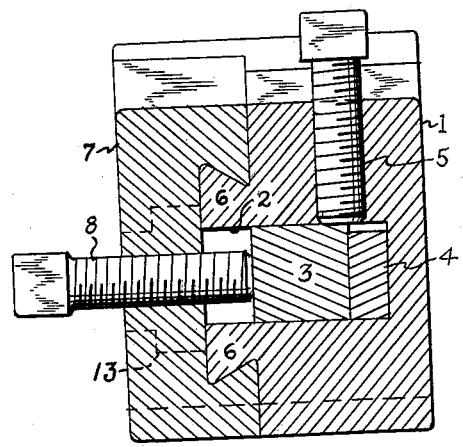
Fig. 4 is a cross sectional view taken on the line 4—4 of Fig. 1.
Figure 5:
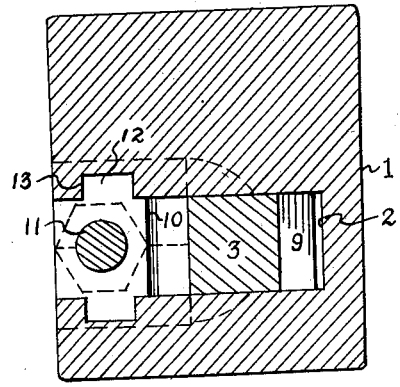
Fig. 5 is a cross sectional view taken on the line 5—5 of Fig. 1.
Figure 6:
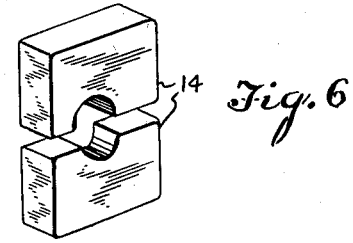
Fig. 6 is a perspective view of a pair of bearing-forming inserts employed in the holder.

In these views, the reference character 1 designates an elongated rectangular steel body having a deep groove 2 opening in one of its lateral faces and extending from end to end of said body. The body is sufficiently weakened by the groove 2 as to permit of slightly springing its portions above and below the groove toward each other, whereby they may function as spring clamping jaws, as will presently appear.

Set into said groove is a tool 3, projecting a suitable distance forwardly of the body 1 so that a cutting edge 3a on the front end of said tool may take effect. If desired, a spacer strip may be interposed between the tool and the groove bottom, as indicated at 4. One or more screws 5 set into the top portion of the body 1 serve to clamp the tool 3 tightly in place. The front end portion of the body 1 is cut away at the side in which the groove 2 opens and the inwardly offset grooved face thus formed is ribbed above and below the groove at the margins of the latter, as indicated at 6. The ribs 6 are jointly dovetailed to fit into and interlock with a plate 7, the inner face of which has a groove undercut at its top and bottom margins to conform to said ribs. Set into the plate 7 and projecting into the groove 2 is a pair of clamping screws 8, bearing at their inner ends on the tool 3 and assisting the screws 5 in rigidly holding the tool. The thrust of the screws 8 against the work reacts on the plate 7 as an outward thrust. Confinement of the dovetailed ribs 6 in the undercut groove of the plate 7 causes the portions of the body 1 above and below the groove 2 to be sprung toward each other by the outthrust acting as described on said plate whereby the clamping force applied to the tool 3 is materially increased.

Fitted in the groove 2 and engaging the rear end of the tool 3 is an abutment 9 having an enlarged nut-forming portion 10 adjacent to the side wall in which the groove opens. A screw 11 extending lengthwise of the body 1 within the groove engages in the nut portion 10 to feed the abutment forwardly or back. The nut has a tendency to cock, due to leverage exerted by the tool 3, and cocking is avoided by forming the nut with upwardly and downwardly projecting tongues 12 sliding in guideways 13 opening in the top and bottom walls of the groove 2. Set into the grooved face of the body 1 near its rear end is a pair of blocks 14 jointly forming a bearing for the screw 11. Said blocks jointly bridge the groove 2, being set into grooves 15 opening upwardly and downwardly from the groove 2, and are thus securely restrained from movement lengthwise of the screw. The screw shank has enlargements 16 and 17 in front and back of the blocks 14, being thus restrained from motion other than rotation in said blocks. The blocks are held within the body 1 by the feed screw 11, which is in turn held from lateral escape by the nut 10. The feed screw is headed rearwardly of the block 1 and hence may readily be adjusted without removal of the holder from its supporting slide (not shown). Said screw affords the abutment 9 a considerable range of adjustment, suiting the holder to tools widely varying in length.

Prior holders for forming and cut off tools in most instances require the slide to be backed out of the machine a maximum distance before the tools may be removed, this being due to fact that removal may be effected only by a forward withdrawal of the tools from their sockets. The described construction permits a lateral removal and insertion of tools, making such operations independent of the slide location in the screw machine.

The clamping effect derived by forming the body 1 with spring jaws above and below the tool and wedging these jaws against the tool is such as to hold a tool perfectly rigid without subjecting the screws to such heavy stresses as are likely to cause mutilation.

Since tool holders for the intended purpose are all quite expensive, a considerable economy results from adapting a single holder to operatively receive a large variety of tools, as in the described invention.

What I claim is:

1. In a tool holder having a tool-receiving groove and a coacting pair of spring jaws spaced apart by such groove, a plate bridging the groove, a screw set into and outwardly reacting on the plate and extending inwardly from the plate toward the groove for clamping a tool in the holder, and coacting means on the jaws and plate resisting the reaction thrust of such screw on the plate tending to move the plate away from the holder, said coacting means including means for converting said movement of the plate into a transverse force against the outside of said jaws, thereby springing the jaws toward each other responsive to such thrust for further clamping a tool in the holder.

2. A tool holder as set forth in claim 1, said plate being set into said holder in a substantially flush relation with the holder face in which said groove opens.

3. In a tool holder having a tool-receiving groove and a coacting pair of spring jaws spaced apart by such groove, a plate bridging said groove and having a threaded opening extending toward the groove bottom, a screw threaded in said opening for clamping a tool in said groove against the groove bottom, and coacting means on said jaws and plate at opposite sides of the groove retaining the plate on the holder, said coacting means including means employing the reaction thrust of the screw on the plate, when the screw is under tool clamping stress, to spring the jaws toward each other, and thus applying an additional clamping stress to the tool.

4. In a tool holder, the combination with an elongated body having a front and a rear end and a groove opening in a lateral face of said body and extending from end to end thereof, a tool occupying the bottom portion of said groove and laterally removable from the groove and projecting from the front end of said body, an adjusting screw extending in said groove lengthwise of said body, between the tool and said lateral face, an abutment for the rear end of said tool, slidable forward and back within the groove, said abutment having a nut forming portion engaged by said screw, and a journal bearing for the screw inserted in said body through said lateral face, the groove having opposed walls channeled transversely to said face to receive and retain the bearing.

5. In a tool holder having a tool-receiving groove and a coacting pair of spring jaws spaced apart by such groove, a pair of ribs respectively formed on the respective jaws and jointly having a dovetail form, a plate bridging said groove and formed with a groove receiving and confining said ribs and conforming to their dovetail form, a screw set into and outwardly reacting on the plate and extending inwardly from the plate toward the bottom of the first-mentioned groove for clamping a tool in the holder, said ribs and plate coacting to resist the reaction thrust of the screw and to consequently spring the jaws toward each other for further clamping the tool in the holder.

MICHAEL J. SCHLITTERS.

REFERENCES CITED

The following references are of record in the file of this patent:

UNITED STATES PATENTS

| Number | Name | Date |
|---|---|---|
| 134,343 | Albro | Dec. 31, 1872 |
| 255,083 | Lund | Mar. 14, 1882 |
| 355,367 | Woodward | Jan. 4, 1887 |
| 1,064,725 | Hall | June 17, 1913 |
| 1,482,916 | Dugar | Feb. 5, 1924 |
| 1,633,314 | Cornwell et al. | June 21, 1927 |
| 1,779,059 | Burkart et al. | Oct. 21, 1930 |
| 1,875,967 | Weddell | Sept. 6, 1932 |
| 2,234,824 | Kingston | Mar. 11, 1941 |
| 2,247,887 | Nascimbeni | July 1, 1941 |
| 2,344,925 | Smith | Mar. 21, 1944 |
| 2,360,137 | Jennings | Oct. 10, 1944 |
| 2,402,650 | Maffia | June 25, 1946 |

FOREIGN PATENTS

| Number | Country | Date |
|---|---|---|
| 76,223 | Switzerland | Feb. 16, 1917 |
| 304,937 | Italy | Jan. 21, 1933 |